United States Patent [19]

Fish

[11] Patent Number: 5,422,626
[45] Date of Patent: * Jun. 6, 1995

[54] ELECTRICAL MONITORING SYSTEM

[76] Inventor: David Fish, Elkana, 44814 Doar Na Efraim, Israel

[*] Notice: The portion of the term of this patent subsequent to Nov. 24, 2007 has been disclaimed.

[21] Appl. No.: 978,581

[22] Filed: Nov. 19, 1992

Related U.S. Application Data

[63] Continuation-in-part of Ser. No. 561,638, Aug. 2, 1990, Pat. No. 5,166,664.

[30] Foreign Application Priority Data

| Aug. 15, 1989 [IL] | Israel | 91325 |
| Nov. 24, 1989 [IL] | Israel | 92432 |

[51] Int. Cl.$^6$ .................................. G08B 1/08
[52] U.S. Cl. .......................... 340/539; 340/531; 340/505; 340/825.08
[58] Field of Search ........... 340/539, 531, 573, 511, 340/506, 500, 825.08, 505; 455/9, 13.4, 38.3, 38.2, 51.1; 379/38–48, 51

[56] References Cited

U.S. PATENT DOCUMENTS

| 4,101,872 | 7/1978 | Pappas ............................. 340/539 |
| 4,506,386 | 3/1985 | Ichikawa et al. ............... 455/38.3 |
| 5,166,664 | 11/1992 | Fish ................................. 340/539 |

FOREIGN PATENT DOCUMENTS

| 0390666 | 10/1990 | European Pat. Off. . |
| 0427158 | 5/1991 | European Pat. Off. . |
| 3529127 | 2/1987 | Germany . |

*Primary Examiner*—Donnie L. Crosland
*Attorney, Agent, or Firm*—Benjamin J. Barish

[57] ABSTRACT

A system for monitoring a location for the occurrence of a predetermined condition thereat includes a transmitter located at the monitored location for normally transmitting a series of first electrical signals at a first repetition rate and in a first time slot; a sensor at the monitored location for sensing the predetermined condition; and a control circuit effective, upon sensing the predetermined condition, to interrupt the transmission of the first electrical signals and to initiate the transmission of a series of second electrical signals at a second repetition rate and in a second time slot both having a predetermined relation to the first repetition rate and the first time slot of said first electrical signals.

19 Claims, 8 Drawing Sheets

ELECTRICAL MONITORING SYSTEM

RELATED PATENT APPLICATION

The present application is a continuation-in-part of my patent application Ser. No. 07/561,638 filed Aug. 2, 1990, to issue as U.S. Pat. No. 5,166,664 on Nov. 24, 1992.

FIELD AND BACKGROUND OF THE INVENTION

The present invention relates to electrical monitoring systems for monitoring locations for the occurrence of a predetermined condition thereat, such as for detecting an attempted intrusion, fire, smoke, gas, motion, the status of an industrial process, or the like.

A large number of electrical monitoring systems have been developed, but efforts are continuously being made to increase the reliability and to reduce the false-alarm rate of such systems.

BRIEF SUMMARY OF THE INVENTION

According to the present invention, there is provided a system for monitoring a location for the occurrence of a predetermined condition thereat; comprising: a transmitter located at the monitored location for normally transmitting a series of first electrical signals at a first repetition rate and in a first time slot; a sensor at the monitored location for sensing the predetermined condition; control means effective, upon sensing the predetermined condition, to interrupt the transmission of the first electrical signals and to initiate the transmission of a series of second electrical signals at a second repetition rate and in a second time slot both having a predetermined relation to the first repetition rate and the first time slot of the first electrical signals; a receiver at a remote location for receiving the first and second electrical signals; and signalling means actuatable by the receiver when receiving the second electrical signals.

According to further features in the described preferred embodiments, the system also includes synchronization means at the remote location synchronized by the first and second electrical signals received by the receiver; and a logic circuit at the remote location effective to enable the receiver during the periods the first and second electrical signals are expected to be received within the first and second time slots.

According to further features in a described preferred embodiment, the synchronization means comprises storing means for storing the signals received in all the time slots in a predetermined number of cycles; summation means for outputting a sum of the signals received in each time slot over a last predetermined number of cycles; and means for determining the correct time slot from the output of said summation means.

According to still further features in a described embodiment, the apparatus includes a plurality of sensors for sensing different predetermined conditions at the monitored location. The control means controls the transmitter to output the pulses of the second electrical signals according to different coded sequences for the different sensors.

According to still further features in another described embodiment, there are a plurality of monitored locations each including a sensor and a transmitter transmitting the electrical signals. The receiver identifies the monitored location according to the time slot, repetition rate, or code of the received electrical signals.

Such an arrangement saves power, increases reliability, substantially reduces the possibility of false alarms due to noise, jamming, etc., and/or generally improves the network performance.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
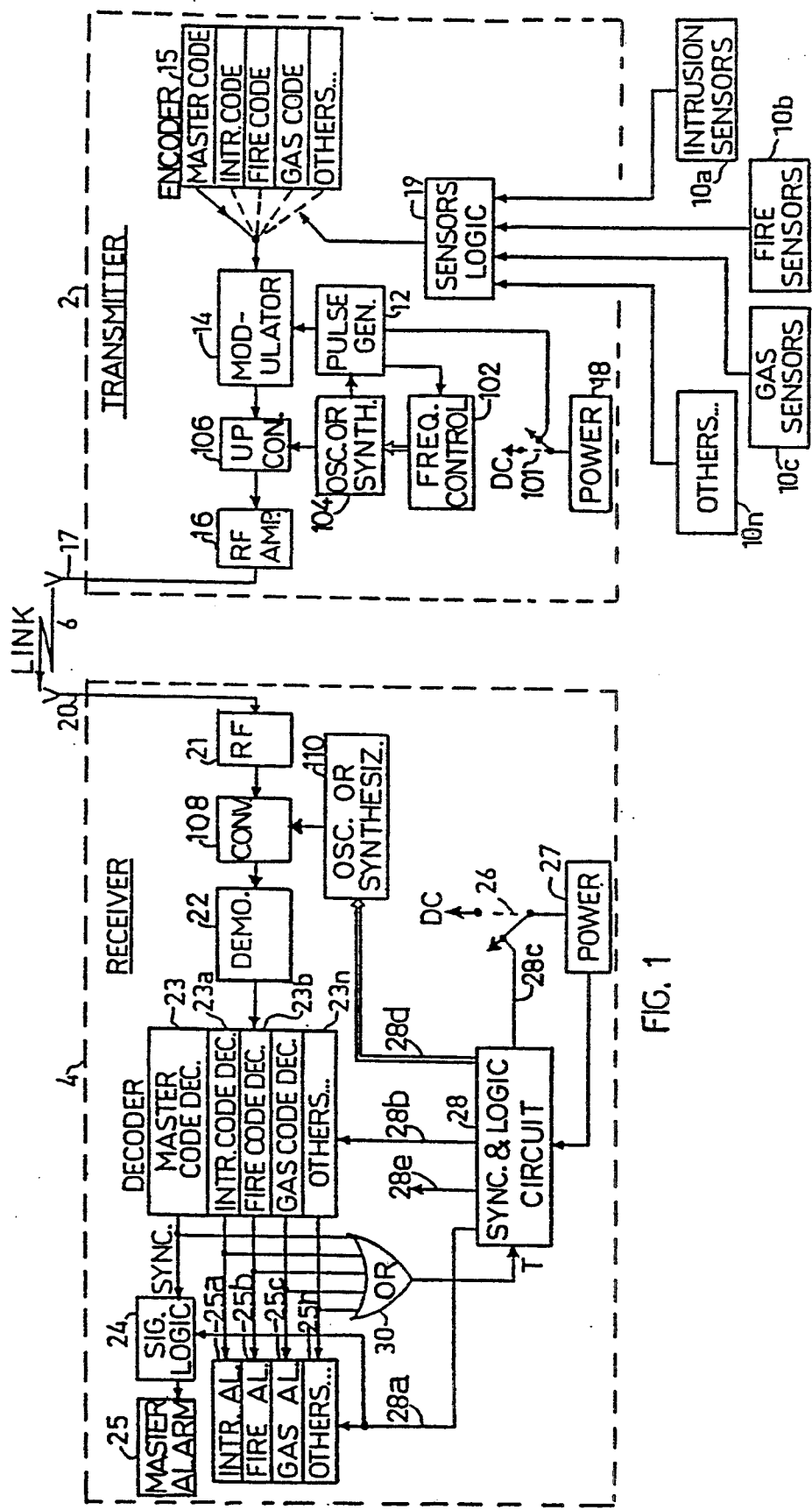
FIG. 1 is a block diagram illustrating one form of apparatus constructed in accordance with the present invention.

The apparatus illustrated in FIG. 1 is for purposes of monitoring a location for the occurrence of any one of a number of different predetermined conditions, such as an attempted intrusion, the occurrence of fire or gas, the status of an industrial process, etc. The illustrated apparatus includes a transmitter, generally designated 2, at the location being monitored, and a receiver, generally designated 4, at a remote location and coupled to the transmitter via a wireless RF link 6. Link 6 may also be a wired link, e.g TV cable, telephone lines, fiber optic line, power line, etc.

Transmitter 2 includes a plurality of sensors 10a–10n to sense the occurrence of any one of the various conditions. As shown in FIG. 1, the transmitter includes an intrusion sensor 10a, a fire sensor 10b, a gas sensor 10c, and one or more additional sensors 10n.

Transmitter 2 further includes a pulse generator 12 controlling a modulator 14 in accordance with signals from an encoder 15, to transmit the signals via an RF power amplifier 16 connected to an antenna 17 and supplied with power from a power supply 18. Encoder 15 is capable of applying to the transmitted signal any one of several different codes according to the condition sensed by the respective sensor 10a–10n. The latter sensors are connected to encoder 15 via a sensor logic circuit 19.

Pulse generator 12 in the transmitter 2, generates bursts of pulses which are encoded by encoder 15 before being transmitted by the transmitter. The period of each burst of pulses is less than the interval between the bursts by at least one order of magnitude, preferably by about three orders of magnitude. For example, the bursts of coded pulses transmitted by the transmitter may have a period in the order of milliseconds, whereas the burst rate may be in the order of seconds. Pulse generator 12 may also control switch 101 in order to save transmitter power and also may control the frequency control unit 102 in order to control the burst frequency, as will be described below.

Under normal operating conditions, the system operates according to a monitoring mode, wherein encoder 15 encodes the transmitted signal from modulator 14 for transmitting a series of first electrical signals, in the form of a burst of pulses of a predetermined code, at a first repetition rate and in a first time slot; this burst of pulses is hereinafter called the master pulses or master code. If one of the predetermined conditions is sensed by one of the sensors 10a–10n, the system switches over to the alarm mode, wherein the transmission of the master code is terminated, and instead, a series of second electrical signals are transmitted, in the form of a burst of pulses having a different code (hereinafter called the sensor code) according to the condition sensed. Thus, if an intrusion is sensed, sensor 10a controls encoder 15 via sensor logic 19 to interrupt the monitoring mode in which the master code was transmitted, and to initiate the alarm mode in which the sensor code, indicating that an intrusion was sensed, is transmitted. The same occurs if another sensor is actuated; that is, the transmission of the master code is interrupted and instead the sensor code for the actuated sensor is transmitted.

The transmitted signals are received by antenna 20 of the receiver 4 and are fed to an RF unit 21, where they are demodulated in demodulator 22 and decoded. The receiver 4 includes a plurality of decoders, namely: decoder 23 for the master code, and decoders 23a–23n for each of the sensors 10a–10n of the transmitter 2.

The receiver 4 further includes an electrical switch 26 connecting the power supply 27 to the above-described components of the receiver. Electrical switch 26 is normally off, but is automatically turned on by the decoder unit 23 via a synchronization and logic circuit 28 at the time slot allocated for transmission of the master code, or of a sensor code from the sensors 10a–10n.

The arrangement is such that so long as nothing abnormal occurs in all the monitored locations, the system operates according to the monitoring mode, in which the transmitter 2 transmits the master code pulses. These are decoded by the master code decoder 23, which continuously resets a counter in the signal logic circuit 24 to prevent the counter from reaching its full count, and thereby to prevent actuation of the master alarm 25. However, should any one of the monitored conditions be sensed by one of the sensors 10a–10n, the transmission of the master code will be interrupted, and this fact will be sensed by the master code decoder 23 which will fail to reset the signal logic circuit 24. If this persists for a predetermined number of cycles, circuit 24 will actuate the master alarm 25, thereby signalling that one of the monitored conditions has occurred which switched the system from the monitoring mode to the alarm mode.

During the alarm mode, a second signal is transmitted, namely the sensor code corresponding to the sensor 10a–10n which had been actuated. The sensor code transmitted will now be sensed by one of the sensor decoders 23a–23n in the receiver 4, and that decoder will (if this persists for a predetermined number of cycles) directly actuate the respective condition alarm 25a–25n, to thereby identify the particular condition sensed.

In order to reduce false alarms and to achieve other described advantages, a particular time slot is allocated for the transmission of the master code and the sensor codes from the sensors 10a–10n. The synchronization and logic circuit 28 enables the receiver 4 to actuate the master alarm 25, or one of the condition alarms 25a–25n, only when electrical signals are received within the allocated bit time slot. The sensor codes, transmitted upon actuation of the sensors 10a–10n, are transmitted at a repetition rate and in a time slot having a predetermined relation to the repetition rate and time slot of the master code transmitted by the transmitter 2, during the monitoring mode of operation.

Figure 2:
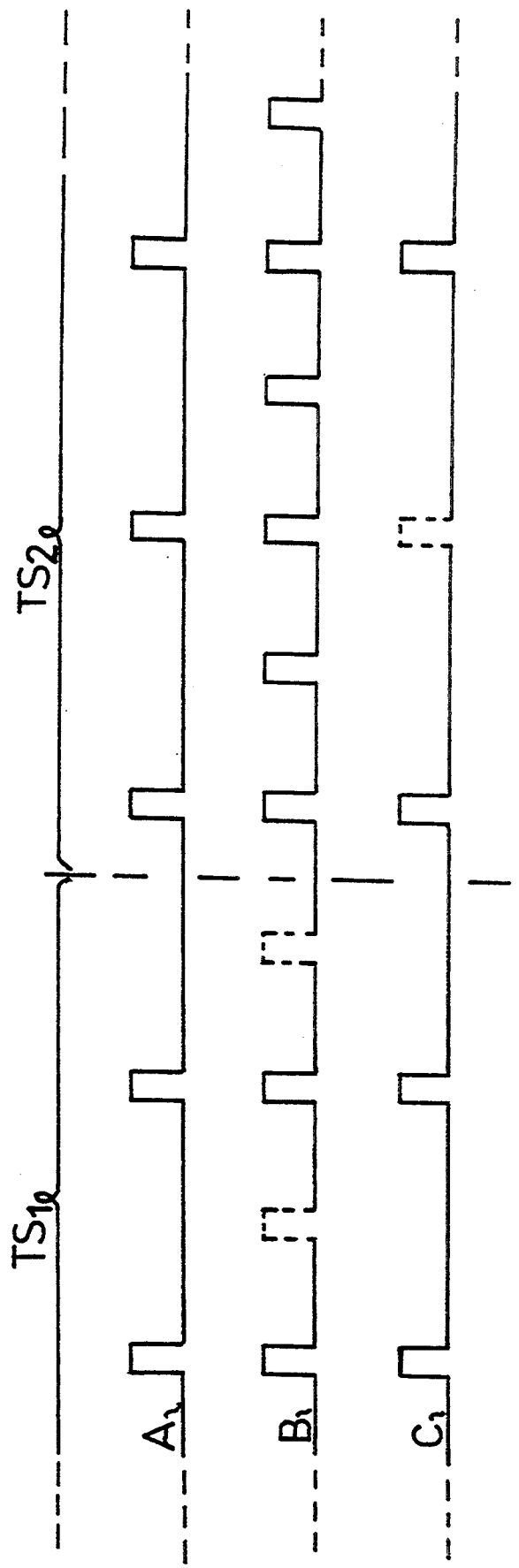
FIG. 2 illustrates various timing diagrams helpful in understanding the operation of the apparatus of FIG. 1.

FIG. 2 illustrates three different predetermined relations between the master code $TS_1$ transmitted during the monitoring mode, and a sensor code $TS_2$ transmitted during the alarm mode. Diagram A illustrates the transmission of the sensor code signals $TS_2$ at the same repetition rate and in the same time slot as the master code signals $TS_1$; diagram B illustrates the transmission of the sensor code signals $TS_2$ at a repetition rate and time slot which are a predetermined multiple (in this case double) the repetition rate and time slot of the master code signals $TS_1$; and diagram C illustrates the transmission of the sensor code signals $TS_2$ at a repetition rate and time slot which are a predetermined fraction (in this case one-half) the repetition rate and time slot of the master code signals $TS_1$. Since the receiver 4 does not know which signals it is receiving, i.e., the first ($TS_1$) or the second ($TS_2$), the receiver is enabled for each of the more frequent time slots in diagrams B and C so as to be ready to receive either the master code or the sensor code signals.

The synchronization and logic circuit 28 enables the receiver 4, to know the expected arrival time of the master code and sensor code signals, and thereby to actuate one of the alarms 25 or 25a–25n only when such signals are received in the allocated time slot. The manner in which circuit 28 performs this function is more particularly illustrated in FIG. 3.

Figure 3:
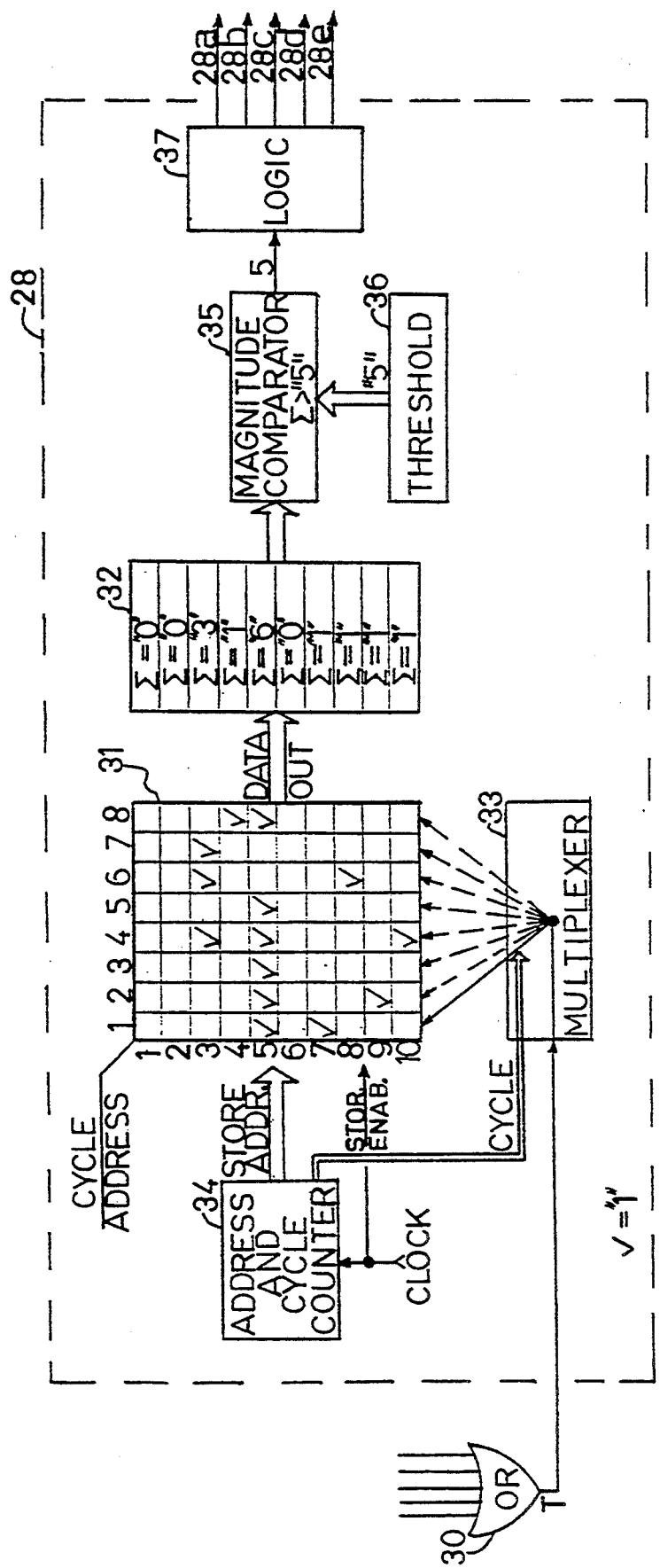
FIG. 3 is a block diagram illustrating the synchronization circuit in the receiver of the apparatus of FIG. 1, FIG. 3a being a variation thereof.

As shown in FIG. 3, the synchronization and logic circuit 28 receives sync pulses from the master decoder 23 and the other decoders 23a–23n via an OR-gate 30. Circuit 28 further includes a RAM (random access memory) 31 which stores the received pulses, a summing circuit 32 for producing a sum of the stored pulses over a predetermined number of cycles, a multiplexer 33 for feeding the pulses to the RAM 31, and an address counter 34.

Figure 4:
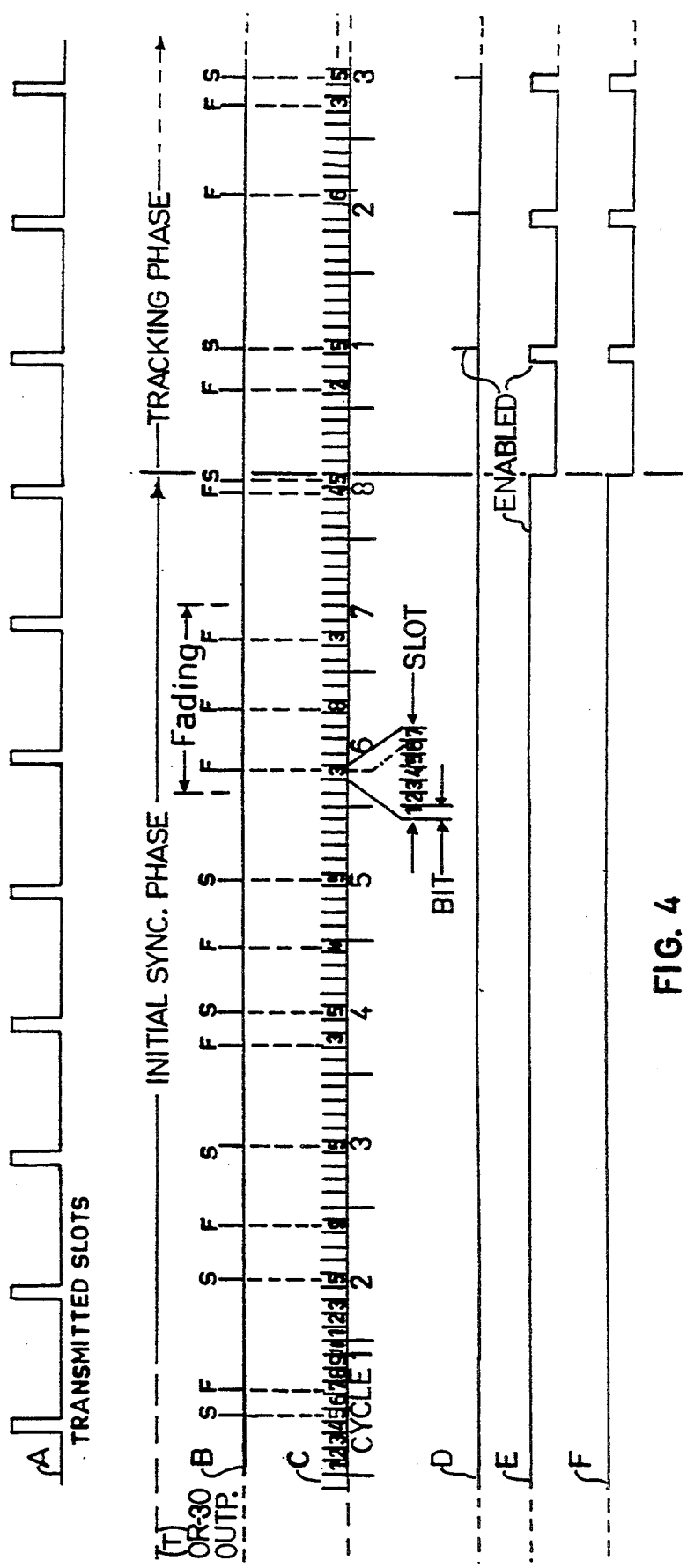
FIG. 4 illustrates timing diagrams helpful in understanding the operation of the synchronization circuit of FIG. 3.

For each cycle, the address counter 34 sequentially addresses the cells of the RAM 31 along its vertical axis and stores the sync pulses as received. The summing circuit 32 accumulates the stored pulses and outputs a sum for the last predetermined number of cycles for each address. The clock determines the period of each address. In the simplified illustration of FIG. 3, the addresses are indicated as slots, but in actual practice they may be in the order of the transmitted bits or pulses. RAM 31 in FIG. 3 illustrates only the slots, but it will be appreciated that each slot is of a multi-bit length, e.g., 24 or 32 bits. In FIG. 4, diagram C illustrates the slot as being of 7-bit length. The address counter 34, therefore, in FIG. 3 would count at the bit rate, and not at the slot rate. This enables more precise synchronization and tracking.

Circuit 28 determines the correct address to be that in which the sum produced in the summation circuit 32 exceeds a predetermined threshold value and defines this address as the time slot of transmission by the transmitter. Circuit 28 thus includes a magnitude comparator 35 which compares the values outputted by the summation circuit 32 with the predetermined threshold supplied by a circuit 36. The so-defined time slot in the resolution of bits is fed to the logic circuit 37 which enables the operation of the receiver 4 to actuate one of the alarms 25, 25a–25n only when receiving signals during the respective time slot. Usually, the period during which the receiver is so enabled will be slightly larger than the code or bit period, so that the receiver will be enabled just before the expected arrival times of the master code and sensor code pulses ($TS_1$, $TS_2$), and will be disabled just after the expected termination time of such pulses.

Figure 3A:
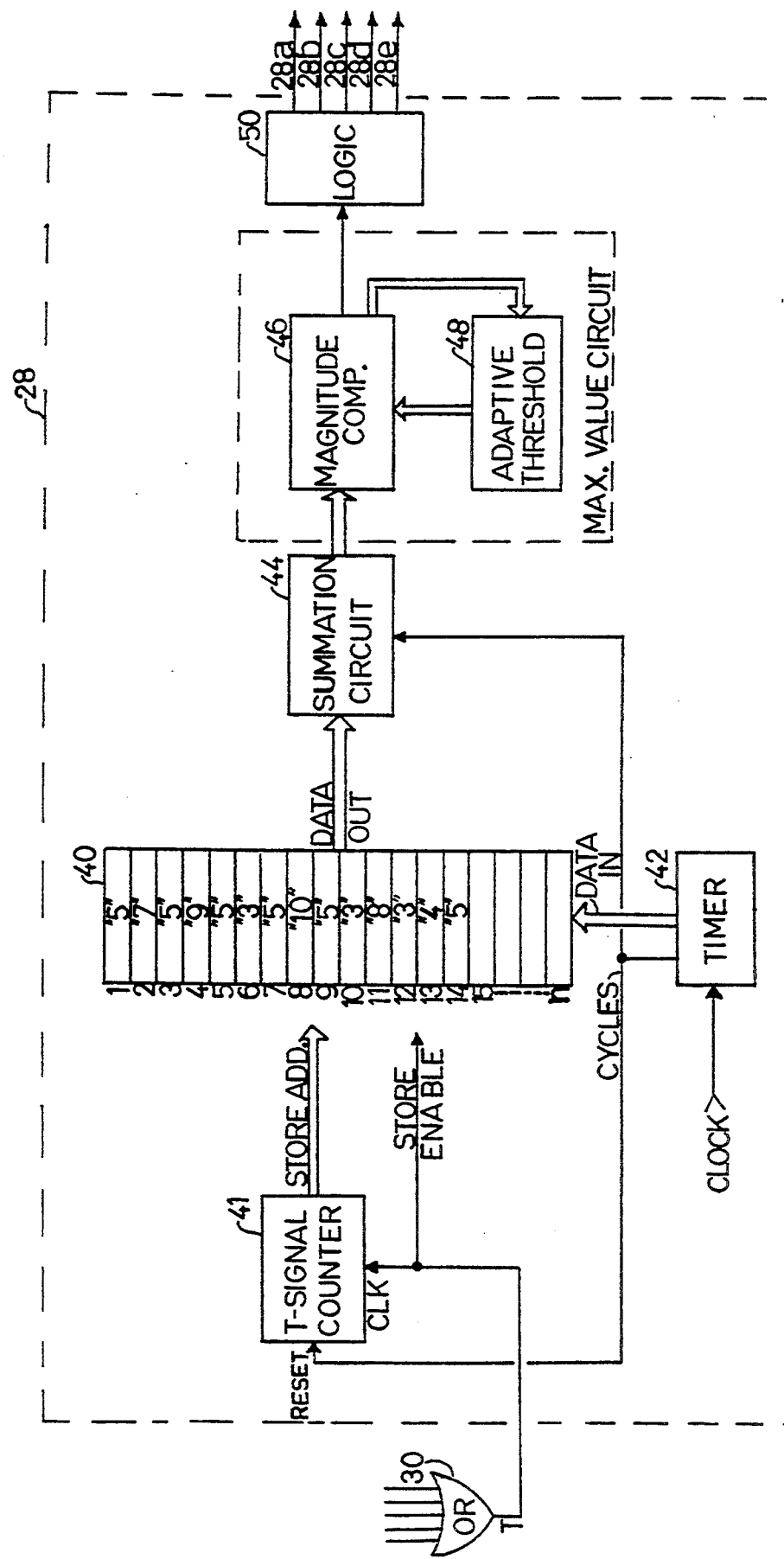

FIG. 3a illustrates a variation wherein the RAM, therein designated 40, stores the time of arrival of the pulses outputted from the OR-gate 30. In this variation, the time of arrival of the pulses is determined by a timer 42 which is controlled by the clock pulses in the order of bits, in a similar manner to the address counter 34 in FIG. 3. The variation of FIG. 3a substantially reduces the required storage volume of the RAM. Such a variation also includes a summation circuit 44, a magnitude comparator 46, athreshold circuit 48, and a logic circuit 50, as described above with respect to FIG. 3. However, in this variation, the threshold circuit 48, instead of supplying a fixed threshold value to be exceeded, supplies an adaptive threshold value to be equalled, namely the maximum value for the last eight cycles in each address or time slot. Such a maximum value circuit could of course also be used in FIG. 3.

The arrangement of FIG. 3 or FIG. 3a enables the receiver initially to be synchronized on the received slots during the first several incoming slots and to continue to track their expected arrival times (which may drift) without loss of synchronization even if several such slots are missed because of fading or because of noise, jamming, overlap, etc. This is more clearly illustrated in FIG. 4.

Thus, FIG. 4 illustrates, in diagram A, the time slot allocated for the transmission of the codes, and in diagram B, the initial condition wherein the valid pulses S occupy the fifth time slot, and false pulses F (e.g., produced by noise, jamming, etc.), occupy other time slots (seventh, ninth, third, tenth, etc.). Diagram C in FIG. 4 illustrates the first eight cycles during which the pulses are accumulated in the RAM as described above with respect to FIG. 3 or FIG. 3a.

In the example illustrated in FIG. 4, the summation circuit 32 will produce a sum of "0" for the first, second and sixth time slots; a sum of "1" for the fourth, seventh, eighth, ninth and tenth time slots; a sum of "3" for the third time slot; and a sum of "6" for the fifth time slot. If the predetermined threshold (as introduced by circuit 36) is the number "5", the magnitude comparator 35 will determine that the correct time slot number is the fifth, since the summation of the pulses received in the fifth time slot of the last eight cycles ("6") exceeds the value of the predetermined threshold ("5"). If the predetermined threshold is an adaptive one, namely the largest number accumulated during the last eight cycles as described in FIG. 3a, the correct time slot will also be determined as being the fifth.

The fifth time slot is thus determined to be the correct one for the master code pulses transmitted during the monitoring mode, and the sensor code pulses transmitted during the alarm mode, and only signals received during that time slot will be effective to reset the counter in the master signal logic circuit 24 controlling the master alarm 25, or to actuate one of the condition alarms 25a–25n. Once this time slot has been determined during the initial synchronization phase, the receiver will track this time slot (which may drift) during the subsequent tracking phase, as indicated in diagrams D, E and F in FIG. 4. It will be appreciated that when the repetition rate and time slot of the transmitted code during the alarm mode are different from the monitored mode (e.g., being a predetermined multiple as shown by diagram B in FIG. 2, or a predetermined fraction as shown by diagram C in FIG. 2), the receiver is enabled at the more frequent rate.

The pulses received in time slot "5" are applied to logic circuit 37 (FIG. 3) which outputs a number of "enable" signals to the receiver 4, as follows (FIGS. 1 and 4):

(a) enable signal 28a (diagram D, FIG. 4) is applied to the signal logic circuit 24 to enable the master decoder circuit 23 to reset the counter in circuit 24 in the monitoring mode, and thereby to prevent actuation of the master alarm 25. Enable signal 28a is also applied to the condition alarms 25a–25n to enable their respective decoders 23a–23n to actuate them upon receiving a sensor code signal from their respective condition sensors 10a–10n in the alarm mode. (Since the enable period of signal 28a is in the order of one bit, this effectively reduces the false alarm rate);

(b) enable signal 28b (diagram E, FIG. 4) is applied to the master decoder 23 and the condition decoders 23a–23n to enable them only in the respective time slot;

(c) enable signal 28c (diagram F, FIG. 4) actuates switch 26 (FIG. 1) to enable the DC power supply during the initial, synchronization phase, and only during the expected time slot in the subsequent tracking phase;

(d) enable signal 28d controls an oscillator or synthesizer 110 (FIG. 1), for a purpose to be described more fully below; and (e) enable signal 28e may be used for enabling or preparing other parts of the receiver circuit 4, usually during the time slot allocated for the reception of the code signal.

As indicated earlier, enable signal 28d may be used for frequency control. Thus, the transmitter circuit 2 and the receiver circuit 4 illustrated in FIG. 1 both include an arrangement for changing the frequency of transmission both when transmitting the master code during the monitoring mode of operation, and the sensor code during the alarm mode of operation. For example, during the transmitted slot, the transmitter may sequentially transmit four frequencies, according to the following sequence $F_1$, $F_2$, $F_3$, $F_4$, $F_1$, - - - in the allocated slot during the cycles 1, 2, 3, 4, 5, - - - , etc. This makes it extremely difficult to jam the system and provides additional protection against failure, fading, etc.

FIG. 1 illustrates the circuit for enabling the transmitter 2 to transmit at any one of a number of selected frequencies, and the receiver 4 to receive at the selected frequency. Thus, the transmitter 2 includes a frequency control unit 102 for controlling the transmission frequency, an oscillator or synthesizer 104 controlled by the frequency control unit 102, and an up-converter 106 between the modulator 14 and the power amplifier 16 to cause the latter to transmit at the selected frequency. The receiver 4 similarly includes a down-converter 108 between the RF unit 21 and demodulator 22, controlled by an oscillator or synthesizer 110, the latter being in turn controlled by the previously-mentioned enable pulse 28d from the synchronization and logic circuit 28. Thus, the frequency control unit 102 in the transmitter 2 can control the transmitter to transmit the four frequencies in the sequence $F_1, F_2, F_3, F_4, F_1$, - - - in the same time slot (e.g., No. 5) during cycles 1, 2, 3, 4, 5, - - - etc., and the enable signal 28d from the syncrhonization and logic circuit 28 can control the receiver 4 to respond only when these four frequencies are received in the same sequence during the sequential cycles in the same time slot.

In addition, since the pulse generator 12 in FIG. 1, and the up-converter 106 are derived from the same frequency source, this enables the receiver to approximate much more precisely the RF frequency, and to control the receiver synthesizer 110 much more precisely via the enable signal 28d from the synchronization and logic circuit 28.

Each decoder 23 and 23a–23n is preferably a correlator (also called a digital matched filter) which checks all the code positions at one time, and therefore enables the coded pulses to be included usually in a single sequence. Using such a decoder provides very fast identification of the transmission, enabling the use of shorter codes without losing sensitivity, since it can identify the transmitted sequence during the duration of one sequence. Also, it saves time (and/or hardware) needed to achieve bit-sync, frame-sync, and data recovery. For example, if one bit period is 1 $\mu$s, and the sequence is built from 32 bits, the decoder usually needs only 32 $\mu$s to identify the sequence, i.e., to achieve the synchronization. The transmitter may therefore transmit usually only one sequence (code) at each burst. Other advantages in using such a decoder is that it provides relative immunity with respect to stronger transmitters (jammers), enables overlapping decoding of several sequences, enables predetermined errors in the received sequence, and achieves better separation with respect to many different users or many different sensors.

Figure 5:
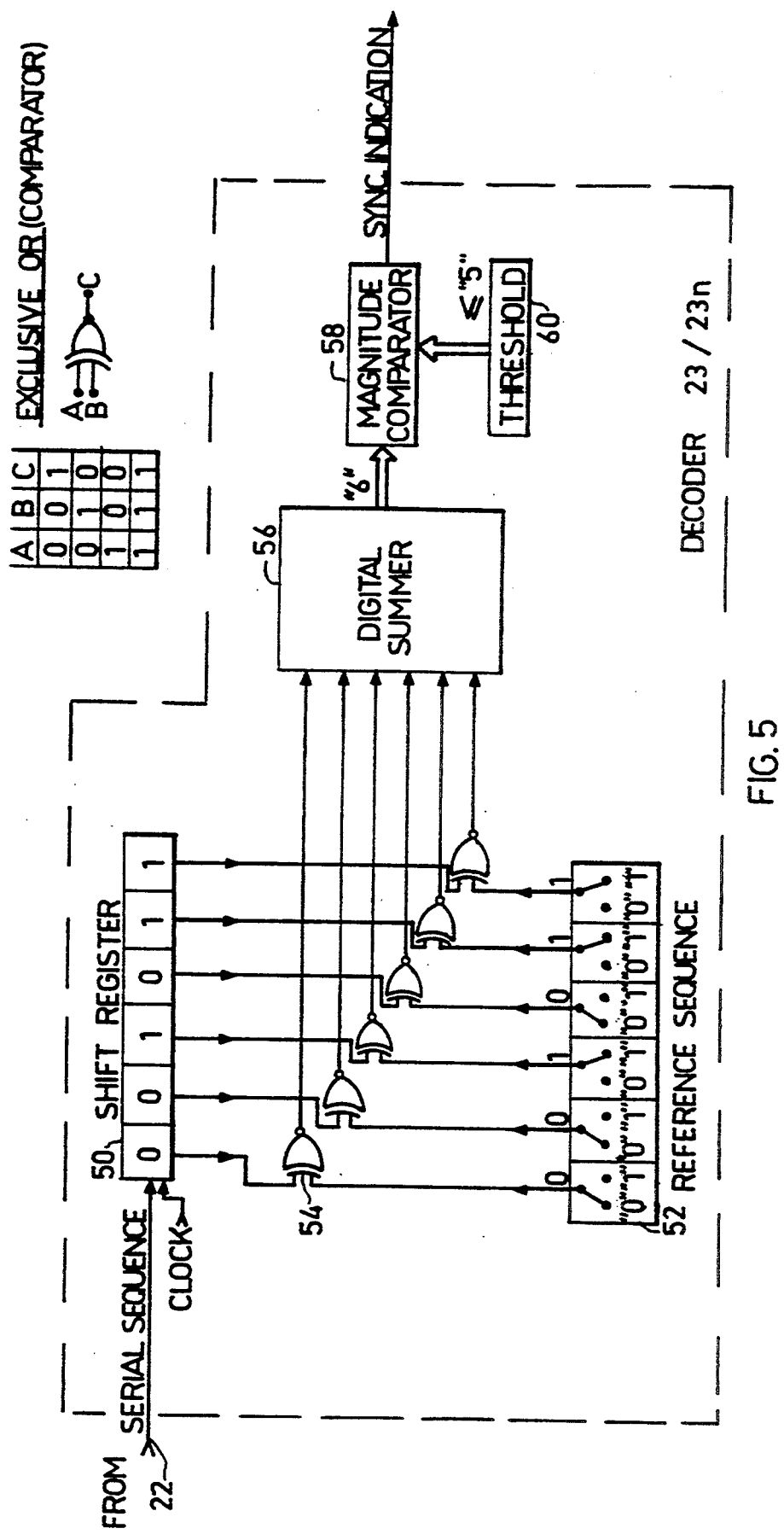
FIG. 5 illustrates one form of parallel-correlator which may be used for the decoder in the apparatus of FIG. 1.

FIG. 5 illustrates one form of correlator type decoder which may be used for the master decoder 23 as well as the sensor decoders 23a–23n in FIG. 1. To simplify the description, FIG. 5 illustrates a correlator having a length only of six single-weighted bits, but it will be appreciated that the actual length of the correlator may be in the order of tens or even hundreds of multi-weighted bits.

Thus, the correlator illustrated in FIG. 5 comprises a shift register 50 for receiving the sequence of pulses from the demodulator 22 in a serial manner. The correlator further includes a plurality of reference, storage devices 52, e.g., registers or switches, for storing a reference sequence, which reference sequence may be manually or automatically preset or changed as desired. Comparator means, in the form of a plurality of Exclusive-Or gates 54, compare the value in each register of the shift register 50 with that in each of the registers 52 to determine whether a match exists; if a match does exist, a "1" will be outputted from the respective gate 54.

The ouputs from gates 54 are fed in parallel to a digital summer 56 which outputs a value representing the number of matches between the shift registers 50 and the reference registers 52. For example, if in this case a match exists between all the shift registers and reference registers, indicating that the serial sequence from demodulator 22 corresponds to the reference sequence preset in the reference registers 52 for all six bits of the two registers, the digital summer will output the value "6". This value is fed to a threshold circuit including a magnitude comparator 58 which may be preset by a threshold presetting device 60, so that when the value outputted by digital summer 56 is equal to or above the predetermined threshold value, a sync pulse will be outputted from the magnitude comparator 58. Even if the digital summer outputs the value "5" (i.e., one bit of the sequence arrived in error), a sync pulse will be outputted from the magnitude comparator 58. Thus, the system enables a predetermined error in the bit sequence, irrespective of the location of the error bit.

As indicated above, the correlator for the master code decoder 23 will thus reset the signal logic circuit 24 to suppress the actuation of the alarm signal 25 so long as the master code is being transmitted; however, immediately upon (or a few cycles after) its interruption, it will fail to reset the signal logic circuit 24, and therefore that circuit will actuate the alarm signal 25 to indicate that a monitored condition has been detected. The other decoders 23a–23n can also be in the form of correlators operating in the same manner.

As indicated above, in practise each of the correlators used for the decoders 23 and 23a–23n would include tens or possibly even hundreds of bits. Since the digital summer 56 receives this information in parallel fashion, this so complicates the construction of the digital summer (to perform parallel summing) such that it is almost impossible to do this with discrete digital components or even with PAL (programmable array logic) where the correlator has a length of many tens or hundreds of multi-weighted bits.

Figure 6:
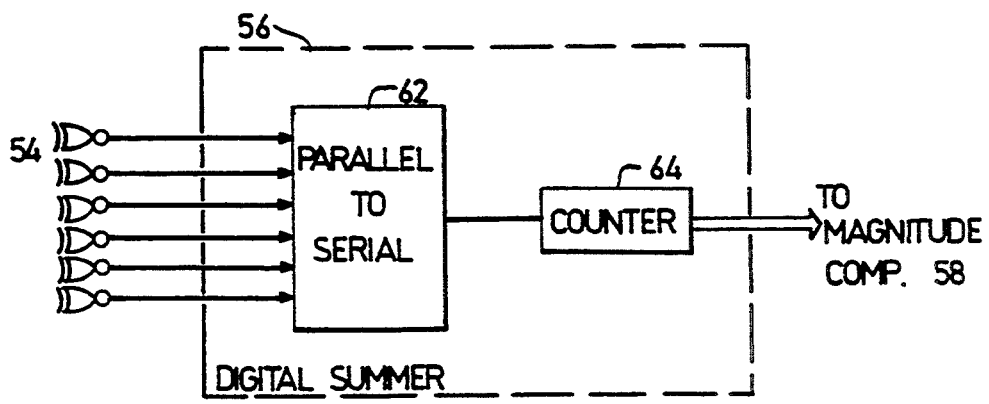
FIG. 6 is a block diagram illustrating the construction of the digital summer in the parallel correlator of FIG. 7.

FIG. 6 illustrates a simplified construction used for the digital summer 56 in FIG. 5. It comprises a parallel-to-serial converter 62 which receives the information outputted in parallel from the OR-gates 54, and converts this information to serial form. For example, converter 62 may be a multiplexer or a shift register that converts the parallel data into serial form. This data is outputted to a counter 64 which counts the number of matches ("1"'s) outputted by the OR-gates 54, so that if six matches occur, the value "6" would be outputted by counter 64. The value of counter 64 is outputted to the magnitude comparator 58 in FIG. 5. In practise, the threshold 60 is lower than the shift register length in order to enable predetermined errored bits.

The arrangement described above provides a number of important advantages: thus, it minimizes the power required by the transmitter 2 as well as by the receiver 4, since the power may be turned on only during the slot number allocated for transmission of the master code during the monitoring mode, and also of the sensor code during the alarm mode. Further, it enables the false alarms to be drastically reduced. In addition, it enables more transmitters to be included in a network, and decreases the probability of overlapping even during the alarm mode. Further, it enables many different codes to be used for different conditions and/or locations; because of the short transmission time of each code burst of the master code during the monitoring mode, as well as the sensor code(s) during the alarm mode, such codes would be difficult to break and/or jam.

Figure 7:
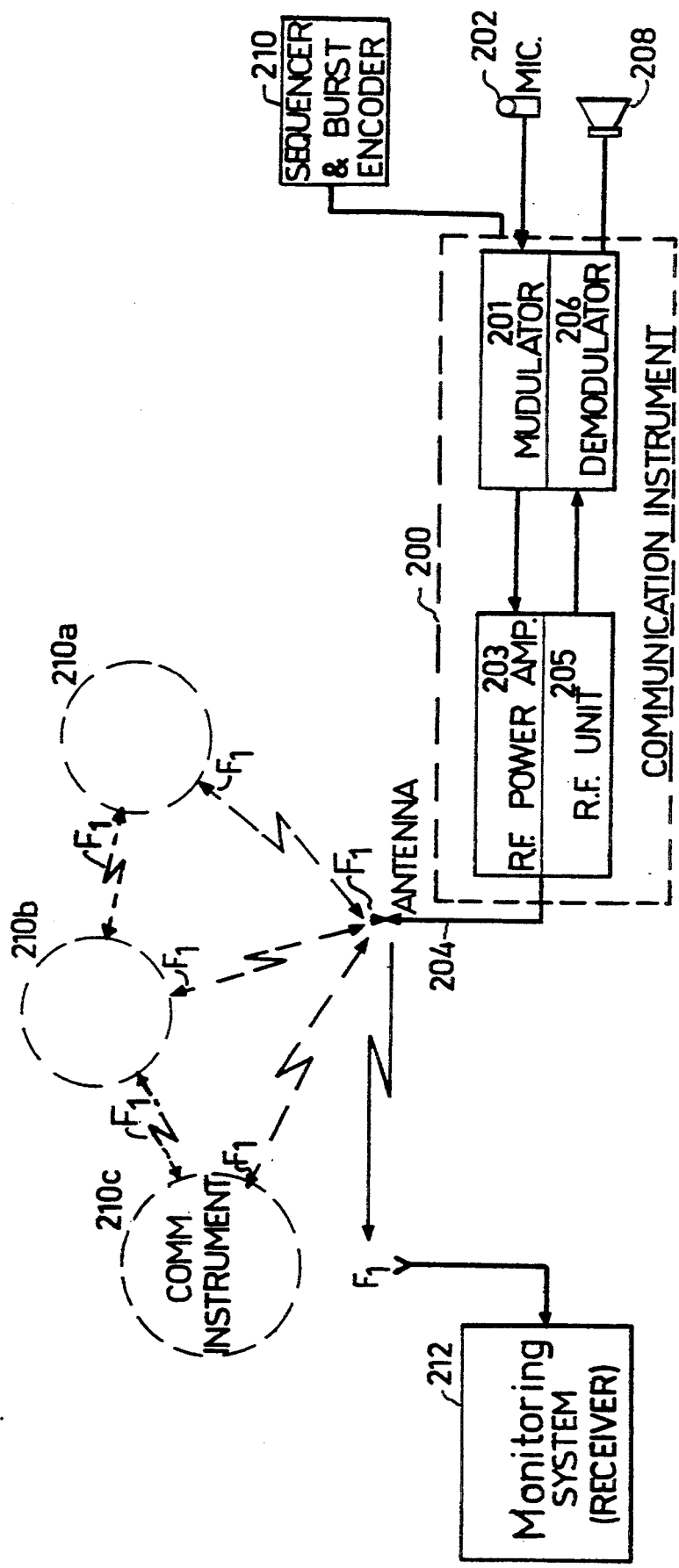
FIG. 7 illustrates the apparatus incorporated in an existing communication system, such as a taxi communication system.

In addition, the above-described arrangement enables the system to be incorporated in an existing communication system, such as a taxi communication system. This is more particularly illustrated in FIG. 7. Thus, the communication system, generally designated 200 (in FIG. 7), includes a modulator 201 receiving signals corresponding to the audio messages to be transmitted and inputted by microphone 202, which signals are modulated onto a carrier wave in an RF power amplifier 203 and transmitted via antenna 204. The central station, and all the taxicabs in communication with the central station, are normally equipped with such a communication system 200 to permit two-way audio communication between the taxicabs and the central station.

The communication system 200 of each of the taxicabs is provided with an encoder, therein designated 210, to produce a burst of coded pulses identifying the respective taxicab and occupying only a very small interval in the normal use of the communication system. Thus, the transmissions of the codes could be done during the idle periods in the normal use of the communication system. It could even be done during the actual transmission of the audio information since any interference will produce very short transient noise as the code bursts are of very short duration. In addition, by using pseudorandom sequences when transmitting pulse codes, linear correlators (i.e., matched filters) as the decoders 23, 23a-23n, and a linear front-end receiver, the monitoring receiver 4 achieves virtual immunity against the interference of the audio transmission.

The central location also has a monitoring system, generally designated 212, which includes the decoder (e.g., 23 or 23a-23n) in FIG. 1, the signal logic (e.g., 24), and the alarm device or devices (e.g., 25, 25a-25n, FIG. 1), such that upon the interruption of the reception of the burst of coded pulses from any particular taxicab, the alarm device, or devices, would be actuated to indicate the occurrence of a monitored condition (e.g., an attempted intrusion), and the particular taxicab involved which is identified by its code.

Receiver 212 could be located at the central station monitoring a fleet of taxicabs. A receiver 212 could also be provided for each individual cab driver (e.g., as a beeper) to enable the driver to monitor the status of the driver's own taxicab.

Figure 8:
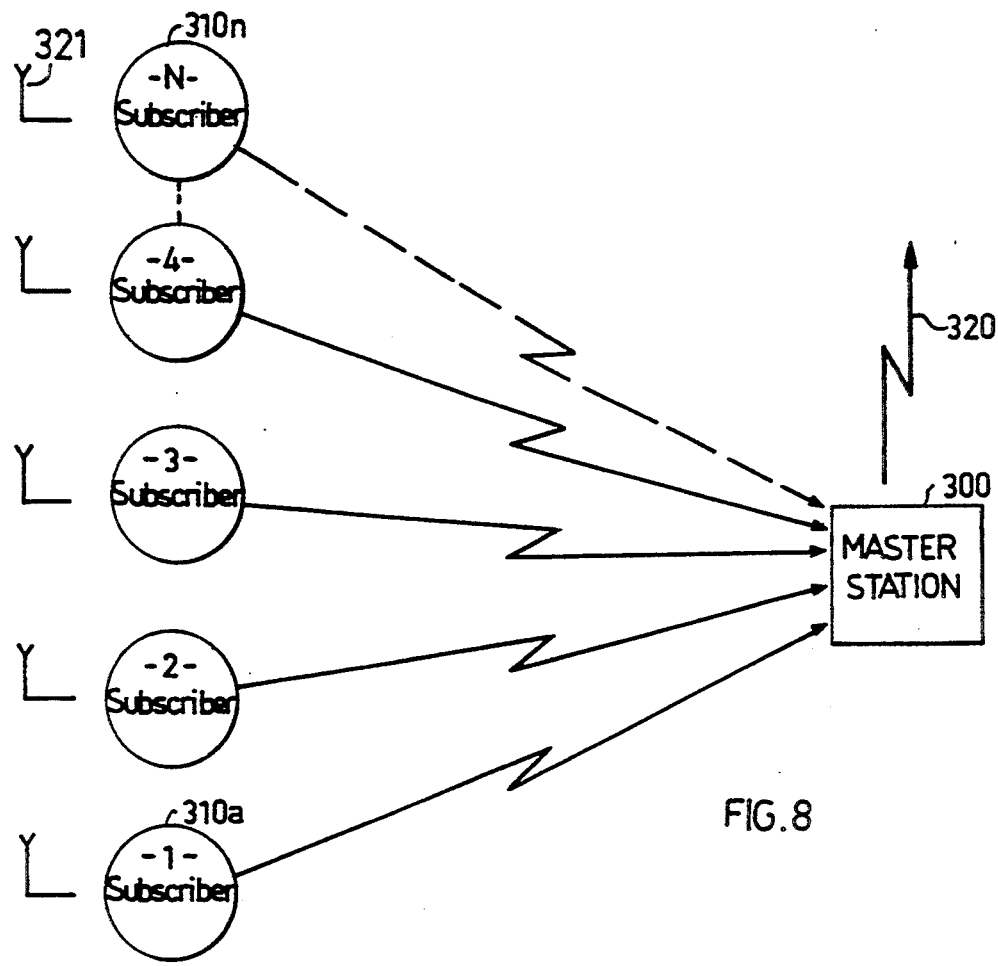
FIG. 8 illustrates the invention incorporated in the apparatus of a system for monitoring a plurality of locations.

FIG. 8 illustrates the invention incorporated in another type of system, wherein the transmitters at the various monitored locations transmit, via the same channel, their bursts of coded pulses during different time slots, and the remotely-located receiver scans the time slots of the transmitters at the various locations to sense whether they are properly transmitting. Such systems may be synchronized or asynchronized networks.

Thus, the system illustrated in FIG. 8 includes a master station 300 monitoring a plurality of subscriber or user units or sensor transmitters 310a-310n. Each such unit includes a transmitter corresponding to transmitter 2 in FIG. 1 capable of transmitting a burst of coded pulses and a special code to identify the respective subscriber or user unit 2. In an async network, the predetermined burst repetition rate of each transmitter is a little different in order to prevent continuously overlapping and to enable the receiver to identify the respective transmitter. Therefore, it may not be necessary to transmit the user's name because the time slot in the sync network, or the predetermined burst repetition rate in the async network, may be the identification name [sign] of the respective transmitter. The receiver is automatically enabled to receive the transmitted signal of the respective receiver just before the expected arrival time of the respective signal. The above-described (with respect to FIG. 4) synchronization process and tracking process are performed for each transmitter in an async network; the synchronization process may also be performed in a sync network to enable it to better identify its time slot despite drift and delay between the various transmitters.

The coded pulses are transmitted by units 310a-310n during different time slots which time slots are scanned by the receiver in the master station 300. If one of the transmitter or user units 310a-310n experiences an interruption in the transmission of its burst of coded pulses, because of the occurrence of a monitored condition (e.g., an attempted intrusion), this will be sensed by the master station 300 (which includes a receiver corresponding to receiver 4 in FIG. 1) in the same manner as described above.

In a sync network, a stranger or a dedicated transmitter station may transmit signals to reset the timing devices against drift and to reset the transmitter's cycle slots, as indicated at 320 and 321.

The system illustrated in FIG. 8 (the sync version) is to be distinguished from conventional multiplexing and TDMA systems in the following respects.

Thus, multiplexing is a method of signalling characterized by the simultaneous and/or sequential transmission and reception of multiple signals over a common channel with means for positively identifying each signal. The signalling may be accomplished over a wire path, a radio carrier, or a combination of both. In a multiplexing system, the subscriber is passive; therefore, any failure in the transmission to the subscriber will cause a false alarm. In addition, a multiplexing system requires the additional time for transmitting to each subscriber.

In TDMA (time division multiplexing) every transmitter has its own time slot but need not use the time slot all the time. In the technique illustrated in FIG. 8, however, each subscriber must use its own time slot to achieve the supervised monitoring.

In all the above-described embodiments, the transmitted code is preferably constituted of pseudorandom sequences which have a unique arrangement of the coded pulses with special characters and special relations among the sequences of a family.

While the invention has been described in connection with several preferred embodiments, it will be appreciated that there may be many variations. Some of the described functions can be implemented by software rather than by hardware, or vice versa. Many other variations, modifications and applications of the invention will be apparent.

What is claimed is:

1. A system for monitoring a location for the occurrence of a predetermined condition thereat; comprising:
   a transmitter located at the monitored location for normally transmitting a series of first electrical signals at a first repetition rate and in a first time slot;

a sensor at the monitored location for sensing said predetermined condition;

control means effective, upon sensing the predetermined condition, to interrupt the transmission of said first electrical signals and to initiate the transmission of a series of second electrical signals at a second repetition rate and in a second time slot both having a predetermined relation to said first repetition rate and said first time slot of said first electrical signals;

a receiver at a remote location for receiving said first and second electrical signals; and signalling means actuatable by said receiver when receiving said second electrical signals.

2. The system according to claim 1, further including: synchronization means at said remote location synchronized by said first and second electrical signals received by said receiver;

and a logic circuit at said remote location effective to enable said receiver during the periods said first and second electrical signals are expected to be received within said first and second time slots.

3. The system according to claim 2, wherein said synchronization means comprises:

storing means for storing the signals received in the time slots in a predetermined number of cycles;

summation means for outputting a sum of the signals received in each time slot over a last predetermined number of cycles;

and means for determining the correct time slot from the output of said summation means.

4. The system according to claim 3, wherein said storing means includes a random access memory having a rectangular matrix of storage elements, the storage elements along one axis storing received signals representing time slot addresses, and the storage elements along a second axis representing the cycle numbers.

5. The system according to claim 4, wherein said control means controls the transmitter to transmit said first electrical signals in the form of bursts of pulses representing a first coded sequence of digital bits at a predetermined clock rate at said first predetermined repetition rate, and upon sensing of said predetermined condition, to interrupt said transmission and to initiate the transmission of said second signals in the form of bursts of pulses representing a second coded sequence of digital bits at said second repetition rate; said receiver including a decoder for decoding said coded sequences of bits and outputting a pulse in response to decoding a coded sequence.

6. The system according to claim 5, wherein said storing storage elements store a plurality of bits, a predetermined number of which define each time slot, said synchronization means operating at the bit rate order.

7. The system according to claim 5, wherein said synchronization means synchronizes the receiver during the first several time slots, and thereafter continues to track the expected arrival time of the time slots without loss of synchronization.

8. The system according to claim 1, wherein said second repetition rate and second time slot of said second electical signals are a predetermined fraction of said first repetition rate and first time slot of said first electrical signal.

9. The system according to claim 5, wherein there are a plurality of sensors for sensing different predetermined conditions at said monitored location, said control means including means for controlling said transmitter to output the pulses of said second electrical signals according to different coded sequences for the different sensors, said signalling means including a plurality of signalling devices each corresponding to and actuated by one of said sensors.

10. The system according to claim 9, wherein said control means controls said transmitter to transmit said second signal pulses in the same time slot for the different sensors.

11. The system according to claim 9, wherein said control means controls said transmitter to transmit said second single pulses in different time slots for the different sensors.

12. The system according to claim 1, wherein said transmitter includes means for transmitting the first and second electrical signals at any one of a plurality of different frequencies, and a selector for selecting the frequency; and said receiver includes a selector for selecting the frequency of transmission by said transmitter.

13. The system according to claim 1, wherein said second repetition rate and second time slot of said second electrical signals are identical to said first repetition rate and first time slot of said first electrical signals.

14. The system according to claim 1, wherein said second repetition rate and second time slot of said second electrical signals are a predetermined multiple of said first repetition rate and first time slot of said first electrical signals.

15. The system according to claim 1, wherein there are a plurality of monitored locations each including a sensor and a transmitter transmitting said electrical signals, said receiver including means for identifying the monitored location according to the time slot or the burst repetition rate of the received electrical signals.

16. The system according to claim 15, wherein each of said transmitters includes an encoder for transmitting the electrical signals in the form of a plurality of pulses identifying the respective location, and said receiver includes a decoder for each location for decoding the received electrical pulses to identify the respective location.

17. A communication system, comprising:

a transmitter located at a first location for normally transmitting a series of electrical signals at a predetermined repetition rate and in a predetermined time slot;

a receiver at a second location for receiving said electrical signals;

synchronization means at said second location synchronized by said electrical signals received by the receiver;

a logic circuit at said second location controlled by said synchronization means to enable said receiver during periods said electrical signals are to be received within their respective time slots;

and control means in said transmitter effective to initiate the transmission of a series of second electrical signals at a second repetition rate and in a second time slot both having a predetermined relation to said first-mentioned repetition rate and time slot of said first-mentioned electrical signals.

18. The communication system according to claim 7, for use in monitoring said first location for the occurrence of a predetermined condition thereat; said system further including a sensor at the first location for sensing said predetermined condition; and control means effective, upon sensing the predetermined condition, to initiate the transmission of a series of second electrical signals at a second repetition rate and in a second time slot both having a predetermined relation to said first-mentioned repetition rate and time slot of said first-mentioned electrical signals.

19. The system according to claim 18, wherein said synchronization means comprises: storing means for storing the signals received in the time slots in a predetermined number of cycles; summation means for outputting the sum of the signals received in each time slot over a last predetermined number of cycles; and means for determining the correct time slot from the output of said summation means;

wherein said storing means includes a random access memory having a rectangular matrix of storage elemnts, the storage elements along one axis storing the received signals representing time slot addresses, and the storage elements along a second axis representing the cycle numbers;

and wherein said control means controls the transmitter to transmit said first electrical signals in the form of bursts of pulses representing a first coded sequence of digital bits at a predetermined clock rate at said first predetemined repetition rate, and upon sensing said predetermined condition, to initiate the transmission of said second signals in the form of bursts of pulses representing a second coded sequence of digital bits at said second repetition rate;

said receiver including a decoder for decoding said coded sequences of bits and producing an output in response to decoding a coded sequence.

\* \* \* \* \*

UNITED STATES PATENT AND TRADEMARK OFFICE
CERTIFICATE OF CORRECTION

PATENT NO.    : 5,422,626
DATED         : June 6, 1995
INVENTOR(S)   : David Fish It is certified that error appears in the above-indentified patent and that said Letters Patent is hereby corrected as shown below:

In Column 12, Line 63, change "Claim 7" to --Claim 17--.

Signed and Sealed this

Twenty-first Day of May, 1996

Attest:

BRUCE LEHMAN

*Attesting Officer*    Commissioner of Patents and Trademarks